Oct. 27, 1964
G. JANSEN, JR., ET AL
3,154,500
STRONTIUM RECOVERY PROCESS
Filed June 13, 1962
2 Sheets-Sheet 1
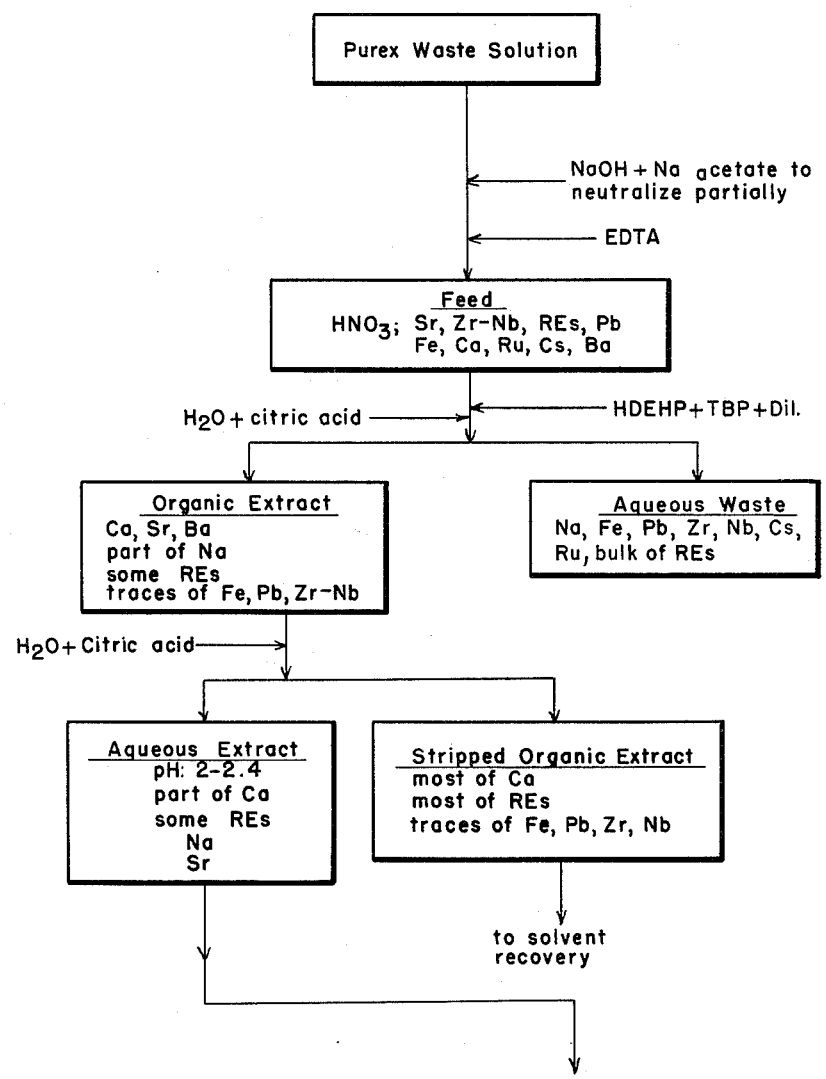
Abbreviations:
REs= rare earths
EDTA = Ethylenediaminetetraacetic acid
HDEHP= di-2-ethylhexylphosphoric acid
$Na_4EDTA$= sodium salt of EDTA
TBP= tributyl phosphate
Dil.= hydrocarbon diluent
INVENTORS
George Jansen, Jr.
Gerald L. Richardson
Allison M. Platt
Lane A. Bray
By
Roland A. Anderson
Attorney.

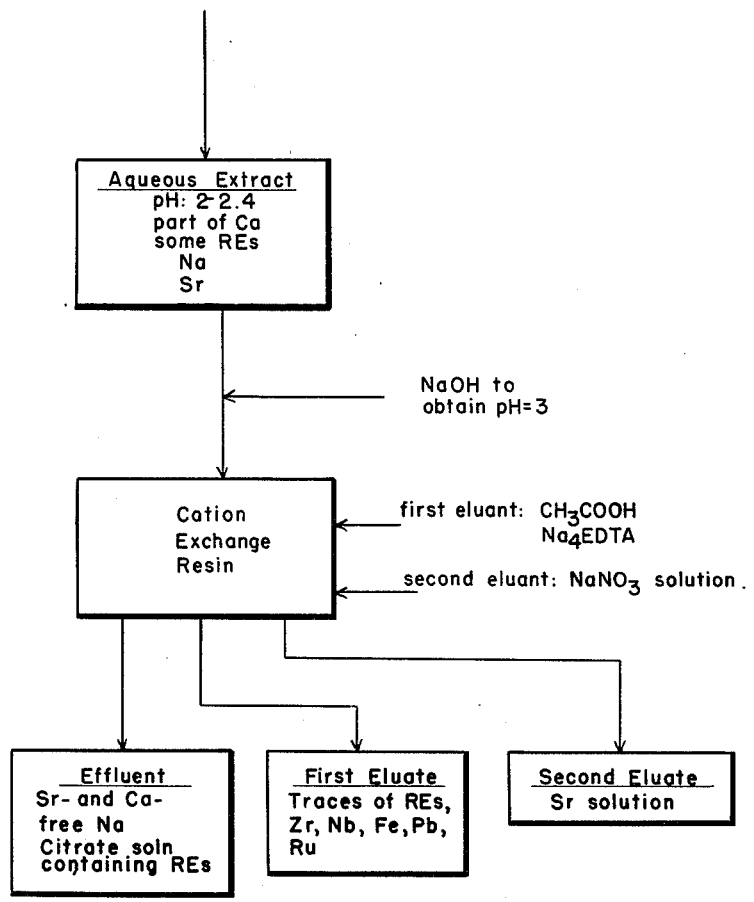

3,154,500
STRONTIUM RECOVERY PROCESS
George Jansen, Jr., Kennewick, Gerald L. Richardson and Allison M. Platt, Richland, and Lane A. Bray, Pasco, Wash., assignors to the United States of America as represented by the United States Atomic Energy Commission
Filed June 13, 1962, Ser. No. 202,337
14 Claims. (Cl. 252—301.1)

This invention deals with the recovery of strontium from aqueous solutions and in particular with the recovery of radioactive strontium by a combined solvent extraction-ion exchange adsorption process.

When uranium-containing fuel material that has been bombarded with neutrons in a nuclear reactor is processed by solvent extraction for the recovery of the plutonium formed and the decontamination of the uranium, for instance by extraction with tributyl phosphate in the so-called Purex process, an acidic waste solution is finally obtained which contains essentially all of the fission products initially associated with the fuel. Some fission products, on account of their intermediate half-lives, have to be removed proir to disposal of the waste solution, because the waste would be hazardous to human beings and animals for too long a period of time.

One of the fission products especially outstanding in this respect is $Sr^{90}$; it has a half-life or 28 years and therefore should be removed from the waste solution prior to disposal of the latter into the ground. Furthermore, $Sr^{90}$ is a desirable fission product, because it emits beta particles only, but no gamma rays. It thus is a valuable source for pure beta rays of constant strength and as such is useful, for instance, in ophthalmology as a topical remedy.

Strontium has been recovered heretofore from the waste solutions mentioned above, and in particular from those obtained by the extraction with tributyl phosphate, by complexing the iron and strontium present in the solution with tartrate; adjusting the pH of the waste solution to between 4 and 6.5; coextracting the strontium and the bulk of the rare earth fission products with di-2-ethylhexylphosphoric acid (HDEHP); back-extracting the strontium and rare earth values together with 2 M nitric acid, thereby leaving the iron in the organic phase; adjusting the pH value in the aqueous strip solution obtained to between 0.5 and 3; preferably adding a small amount of tartrate to complex any back-extracted iron; extracting the aqueous strip solution again with HDEHP whereby the rare earth fission products are extracted, while the strontium remains in the aqueous strip solution; and back-extracting the rare earth values from the HDEHP phase with nitric acid.

While this process used heretofore is quite satisfactory, it does show a number of drawbacks. In the first extraction step the rare earth fission products are extracted together with strontium, so that large volumes of liquids have to be processed. Another drawback of that process is that the amount of tartrate added prior to the second extraction step has to be dosed very carefully, because an excess of it would also bring about extraction of strontium together with that of the rare earths and thus impair the separation.

It is an object of this invention to provide a process for the recovery of strontium from radioactive waste solutions wherein removal of the codissolved rare earth values from the strontium is accomplished in the first separation step.

It is another object of this invention to provide a process for the recovery of strontium from radioactive waste solutions whereby radiation damage to extractants and adsorbents and also shielding requirements are reduced to a minimum, since the strontium is separated from the bulk of the high-energy fission products at an early stage.

It is also an object of this invention to provide a process for the recovery of strontium from radioactive waste solutions in which comparatively small volumes of organic extractants and adsorbents are necessary, so that equipment of a comparatively small size can be used.

It is finally also an object of this invention to provide a process for the recovery of strontium from radioactive waste solutions whereby strontium is obtained in the form of a relatively concentrated solution in very pure form free from gamma emitters and nonradioactive isotopes of rare earths.

The process of this invention is based on the novel combination of a number of facts and findings. Eethylenediaminetetraacetic acid (EDTA), when added to an aqueous waste solution whose pH value is between 4 and 5, complexes iron, lead and multivalent fission product values such as zirconium, niobium, ruthenium and lanthanide rare earths; however, it does not complex barium, calcium and strontium. Di-2-ethylhexylphosphoric acid (HDEHP) extracts barium, strontium, calcium and a fraction of the sodium present in the EDTA-complexed solution; this was known per se in the art. However, it was discovered by the inventors that HDEHP does not extract EDTA-complexed values such as iron, lead and multivalent fission products. It was furthermore found that citric acid, when added to an organic HDEHP solution which contains strontium, calcium, sodium and fission product values, selectively back-extracts the strontium and sodium values, but does not provide enough hydrogen ion to also strip other fission product values present so that they are retained in the organic phase. It was established that this selective back-extraction has to be carried out under conditions which yield a pH of between 2 and 2.4 in the aqueous strip solution. Finally, it was also found that cation exchange resins selectively adsorb strontium but that they do not adsorb citric-acid-complexed fission products.

The process of this invention comprises adjusting the pH value of an aqueous waste solution containing strontium values, rare earth fission product values, zirconium-niobium values, lead values, iron values, alkaline earth metal values, alkali metal values and ruthenium values to between 4 and 5; addiing EDTA to the solution, whereby a feed solution is obtained in which all cations are complexed, except the alkali and alkaline earth metal values; contacting the feed solution with HDEHP whereby the calcium, strontium, part of the sodium and a small fraction of the lanthanide rare earths are extracted into an organic extract phase, while the remaining sodium, most of the lanthanide rare earths, iron, lead, zirconium, niobium, cesium and ruthenium are retained in the aqueous waste solution; separating the organic extract from the aqueous waste; adding an aqueous citric acid solution to the organic extract, whereby an aqueous extract is obtained containing part of the calcium, some rare earth values, sodium and practically all of the strontium values, whereas the stripped organic extract contains most of the calcium and lanthanide rare earth values and traces of iron, lead, zirconium and niobium values, said citric acid solution being added in a quantity and concentration to yield a pH value of between 2 and 2.4 in the ensuing aqueous extract; separating the aqueous extract from the stripped organic extract; adjusting the pH value of the aqueous extract to about 3; contacting a cation exchange resin with the adjusted aqueous extract, whereby the strontium and calcium are adsorbed on the resin, while the citric-acid-complexed rare earth values remain in the aqueous extract; separating the resin from the aqueous extract; contacting the cation exchange resin with a wash solution of acetic acid and the sodium salt of EDTA, whereby adsorbed traces of rare earths, zirconium, niobium, iron, lead and ruthenium are removed from the resin; separating the wash solution from the resin; contacting the resin with an aqueous solution of sodium nitrate, whereby all strontium is eluted from the resin and dissolved in said sodium nitrate solution; and separating said strontium-containing sodium nitrate solution from the resin.

In the attached drawings a flow sheet is shown which contains the essential steps of the process carried out as a continuous column operation, the second sheet being the continuation of the part of the process shown in the first sheet of drawings.

Aqueous waste solutions as they are obtained by the so-called Purex process contain nitric acid in an approximate average concentration of 1 M; strontium in a concentration of about 0.0005 M; 0.003 M zirconium-niobium; 0.005 M lanthanide rare earth; 0.02 M lead; 0.14 M iron; 0.003 M calcium; and possibly also traces of ruthenium, cesium and radioactive barium.

A solution of the type just described has to be partially neutralized to achieve satisfactory separation in the extraction step. A pH value of between 4 and 5 is suitable; however, a pH of about 4.7 yielded the very best results. Neutralization is carried out by the addition of a proper amount of a sodium hydroxide solution, and sodium acetate is added as a buffer. The separation of strontium from lanthanides is best at a pH value higher than 5, but the strontium becomes complexed to an essential degree at such a pH value, which impairs its extraction. Therefore a compromise is necessary, and the best pH value is at about 4.7, as mentioned.

As the complexing agent, EDTA or its sodium salt, $Na_4EDTA$, is normally used. However, other complexing agents, such as N-hydroxyethylethylenediaminetriacetic acid (HEEDTA) or diethylenetriaminepentaacetic acid (DTPA) and their sodium salts, can be used instead. A great excess of the complexing agent is not necessary over the amount required for complexing all of the multivalent cations. It is desirable, though, to provide a concentration of free, nonreacted, complexing agent of between 0.05 and 0.1 M per liter. Strong complexes are formed with these complexing agents and iron, lead, zirconium, niobium, ruthenium and rare earths; strontium, barium, calcium and cesium do not form such complexes. DTPA complexes lanthanides more strongly than does EDTA, and therefore the former is preferred; it yields a better decontamination of the strontium from the lanthanides.

HDEHP is used as the extractant. It is preferably mixed with some tributyl phosphate whereby the solubility of the extracted cations in the organic phase formed and also that of the salts formed of the solvent are promoted. Furthermore, a diluent is advantageous to obtain better phase separation. Hydrocarbons, such as kerosene fractions, are suitable for this purpose. A good solvent mixture, used in the all-hydrogen form, consisted of a kerosene solution 0.4 M in HDEHP and 0.2 M in tributyl phosphate. All calcium, strontium and part of the sodium and rare earths are extracted, while the aqueous solution retains part of the sodium and most of the rare earths, the iron, lead, zirconium, niobium, cesium and ruthenium.

The organic phase is then subjected to a scrubbing step with a small volume, about ⅓ of that of organic extract, of scrubbing solution to disengage entrained aqueous droplets and thus to improve phase separation and also to strip part of the extracted sodium which would interfere with the pH control required later in the process. Citric acid is suitable as the scrubbing agent; its pH value should be between 2.6 and 3. This scrubbing step is optional; however, the process is greatly improved by it.

After scrubbing, an aqueous waste solution containing most of the sodium, iron, lead, lanthanide rare earths, zirconium niobium, ruthenium and cesium is obtained and separated from an organic extract which contains practically all of the strontium, calcium, part of the barium, a small part of the sodium and some, about 10%, of the lanthanides. A typical run yields the following decontamination factors at this point (amount of element in the solution used: amount of element in the solution obtained): >2 for barium, 10 for lanthanides and >500 for iron, lead zirconium, niobium and ruthenium.

The organic extract is then contacted with a stripping agent. Citric, maleic or tartaric acid can used. Citric acid is preferred because it is more soluble than maleic acid and has less tendency to complex, and thus extract, rare earths than tartaric acid. Other acids whose pH values are between 2 and 4 could also be used. The citric acid is best added as an about 1 M solution that has a pH value of about 1.4. The quantity of citric acid is chosen so that in the aqueous extract obtained by the stripping step a pH value of between 2 and 2.4 results. Under these conditions strontium, barium and sodium values are back-extracted, as are part of the calcium and a small part of the rare earths. Ninety-five percent of the rare earths and most of the iron, lead, zirconium and niobium are complexed and remain in the organic extract. However, any entrained aqueous droplets containing iron, lead, zirconium and niobium are removed by the acid solution.

The volume of the stripping agent should be considerably less than that of the organic extract to be treated and preferably should be about ⅓ of the organic volume. Both pH value and volume of the aqueous extract, are rather critical in order to obtain the separation desired. At a pH higher than 2.4 or a lower aqueous: organic volume ratio, strontium is not stripped to a high degree, while at a lower pH value and a higher aqueous: organic ratio, too great a fraction of calcium and rare earths is backed-extracted. If the opimum conditions given above are observed, the decontamination factor of the strontium from the rare earths in the stripping step is usually greater than 50 and that from the calcium greater than 10. The organic extract, after stripping with the acid, is taken to solvent recovery.

The aqueous extract, which mainly contains all strontium, sodium, little calcium and very small quantities of rare earth metal values, is then processed for the purification, isolation and concentration of the strontium. A cation exchange resin is used for this purpose. The pH value of the aqueous extract has to be adjusted to give proper cation exchange adsorption; the optimum pH value is between 2.5 and 3.5. Any cation exchange resin can be used; it preferably is employed, however, in the sodium form. The particle size may vary widely; especially good results were obtained with particles between 40 and 60 mesh.

Strontium and any calcium which had remained in the aqueous extract are adsorbed on the resin, while citric-acid-complexed rare earths remain in the aqueous solution, in the supernatant in the case of a batch process or in the effluent in the case of a continuous column operation. A resin found particularly suitable for the process of this invention is that prepared according to Example I of U.S. Patent No. 2,366,007, granted to D'Alelio on December 26, 1944. The capacity of the resin for strontium is dependent to a certain degree on the pH value of the aqueous solution fed into it. pH values of 3.5, 2.8, 2.45 and 2.0 yielded loadings of 17, 33, 40 and 62 grams of strontium per liter of resin.

The resin also takes up trace quantities of rare earth values, such as zirconium, niobium, iron, lead and ruthenium, that had not been complexed by the citric acid. These rare earths are eluted from the resin in a separate fraction, called "first eluate" in the flow sheet, by means of a wash solution of a complexing agent. EDTA, HEEDTA, DTPA, the sodium salts thereof or citric acid can be used as the complexing eluant. An aqueous solution 0.02 M in Na₄EDTA and 0.2 M in acetic acid and having a pH value between 3.5 and 4 yielded especially satisfactory rseults.

Thereafter the strontium is eluted. The inventors found an aqueous sodium nitrate solution particularly advantageous, because a relatively small volume of it is necessary, so that the strontium is obtained in the form of a concentrated solution. The concentration of the sodium nitrate solution is preferably between 2 and 6 M, a concentration of 4 M being considered best. While, for instance, three volumes of a 3 M sodium nitrate solution eluted 92%, the same amount of a 2 M sodium nitrate solution eluted only 72%. On the other hand, five column volumes of eluant were required for the 3 M solution to elute 99.5% of the strontium, while seven volumes of a 2 M sodium nitrate solution were needed to elute 98.5%.

Strontium can then be precipitate from the sodium nitrate "second eluate" by the addition of potassium bicarbonate or other carbonate. Instead of precipitating the strontium as the carbonate, it can be precipitated with hydrogen peroxide as the strontium peroxide, $SRO_2 \cdot 8H_2O$; in this case the solution has to be made alkaline with sodium hydroxide, and elevated temperature is preferred for this precipitation step. This precipitation step is not being claimed per se as an invention.

Selection of the proper flow ratios is rather important in the process of this invention, when carried out in a continuous manner, to obtain a good separation and also to have the strontium present in the product solution in concentrations as high as possible. Satisfactory ratios to which the inventors usually adhered in developing the process of this invention are feed:scrub in extraction column:solvent extractant:back-extractant:sodium nitrate resin eluant, ~100:5:25:6:2.5. It will be obvious that the strontium is thereby concentrated to a considerable degree in the course of the various steps.

Assuming, for instance, that 100 volumes of waste solution from the Purex process are used, about 33 volumes of extractant, e.g., HDEHP, are contacted with the feed solution so that the strontium is concentrated to ⅓ of its volume in this first separation step of the flow sheet. Then the strontium is back-extracted into about eight volumes of citric acid solution, which means another concentration to ¼ of the organic volume. Finally, after adsorption of the strontium on the cation exchange resin, the strontium is eluted with about 3.3 volumes of sodium nitrate solution; this amounts to an over-all thirtyfold concentration, since the strontium is transferred from the original 100 volumes to 3.3. volumes. The over-all decontamination factors under these conditions usually are above $5 \times 10_4$ for each of zirconium, niobium, ruthenium, lead and iron, about $2 \times 10_4$ for the lanthanide rare earths and about 10 for calcium.

As has been indicated above, the process can be carried out as a batch process or, and this is the preferred way, in a continuous countercurrent operation using extraction and adsorption columns. For a fully continuous operation in the adsorption phase of the process, two columns should be used, one being in the stage of elution, while the other is in that of loading and vice versa.

It will be readily obvious to those skilled in the art that a number of advantages are inherently present in the combination process of this invention. The combination of EDTA or other suitable complexing agents at a pH of between 4 and 5 with the solvent extraction of strontium by means of HDEHP accomplishes in the very beginning, in one extraction cycle, the removal from the strontium of most of the radioactive fission products, such as lead, iron, zirconium, niobium, ruthenium, cesium and also of a fraction of the rare earths. Moreover, the removal of lead and iron, both of which are present in a large excess over the strontium quantity in the type of solution to be treated, without extracting them, but rather by extracting the relatively small quantity of strontium into the organic phase, cuts down considerably the volume of solvent extractant required. Because the bulk of the highly radioactive fission products remains in the aqueous feed solution, the radiation damage to the solvent, cation exchange resin, etc. is decreased.

The selective stripping of strontium from the organic extract with citric acid at a pH of about 2 provides a further decontamination from rare earths, calcium, iron, zirconium, niobium and lead. This citric acid, due to its complexing effect on the rare earths, causes suppression of coadsorption of the rare earth fission products on the ion exchange resin, which represents another step of decontamination.

The use of the cation exchange resin at the tail end of the process, where the strontium solution is already comparatively concentrated, instead of at the head end, where it is dilute and where the high acid and sodium concentrations and also the multivalent cations present in the solution would compete with the strontium for the resin, greatly reduces the amount of resin needed and the time for loading, washing and elution cycles of the resin adsorption phase. Washing of the resin with EDTA at a pH value of about 4 complexes and removes residual traces of rare earths, iron, lead, zirconium and niobium and this represents still another step of strontium decontamination from these fission products. Citric acid, at a pH of about 3, may be used instead of the EDTA.

Example 1 describes an actual "run" employed in the production of strontium-90 for use as a heat source in a thermoelectric power generator.

EXAMPLE 1

The process was carried out in a plant comprising a compound extraction column, hereinafter called the "A" column, a stripping, or "B" column, and an ion exchange column.

The A and B columns were pulsed columns containing perforated plates.

The compound extraction, or A column, was 4 inches in diameter with a 10 foot extraction section and a 15 foot scrub section. Both disengaging sections were 8 inches in diameter and 5 feet long. The top disengaging section was serviced by a temperature element, interface-specific gravity dip tubes, and a stabilizing rate-indicating overflow orifice. The bottom disengaging section contained an interface jet line, a remote indicating interface float, a temperature element, a differential pressure cell to indicate column loading, and pulse transmission lines from a long vertical shaft piston pulser. Bottom interface control was used exclusively in the A column to give an organic-continuous column.

The 4 inch diameter stripping, or B column, was 16 feet tall and was operated exclusively aqueous continuous. The disengaging sections were 8 inches in diameter. The top section was three feet long and contained dip tubes for interface detection. The bottom section was 5 feet long and contained a temperature element, an interface float (used to detect floods), a differential pressure cell, and the pulse transmission line.

The ion exchange column was a single fixed bed unit containing 100 liters of 50–100 mesh Dowex50W x 12 cation exchange resin. This is the resin of Example 1 of the D'Alelio patent cited above. Eight inches in diameter and 15 feet high, the column was serviced by a temperature element, a water cooling jacket and numerous remotely operated ball and flow control valves to permit resin loading, discharge washing, backflushing, etc. For disposal, the resin was jetted into a filter container for burial.

The feed was prepared from 12,000 liters of Purex crude by adding sodium acetate for pH control and the sodium salt of EDTA at about 0.06 M in excess of stoichiometric requirements as a complexing agent for Fe, Pb, ZrNb, Ru, and rare earths. Additional caustic was required to adjust the pH to 4.7–4.8.

The composition of the crude before, and of the feed after, the addition of the reagents is given in Table 1.

*Table 1*

[Element concentrations in M, isotope concentrations in curies/liter]

| Element | Crude | Feed |
|---|---|---|
| Sr | 0.0025 | 0.0034 |
| Ca | 0.005 | 0.004 |
| Ba | 0.0004 | 0.0003 |
| Fe | 0.024 | 0.017 |
| Pb | 0.019 | 0.013 |
| Na | 0.3 | 1.3 |
| H | 0.78 | pH 4.8 |
| Acetate | 0 | 0.45 |
| EDTA | 0 | 0.088 |
| Citrate | 0 | 0.032 |
| Sulfate | | $\geq 0.0007$ |
| Isotope: | | |
| Sr-90 | 18 | 24 |
| Sr-89 | 51 | 68 |
| Ce-144 | 165 | 116 |
| ZrNb-95 | 43 | 30 |
| Ru-106 | $\leq 2$ | 1.4 |
| Pm-147 | | |
| Volume, L | 12,000 | 17,100 |

The citrate content is derived from a recycle step which will be mentioned later.

This feed was introduced between the lower or extraction section and the upper or scrub section of the "A" column at the rate of 4 liters per minute. The solvent, consisting of a kerosene hydrocarbon solution .4 M as to HDEHP and .2 M as to TBP was fed to the bottom of the column at the rate of one liter per minute.

A scrub stream was fed to the top of the "A" column at 0.25 liter per minute. It consisted of an aqueous 0.6 M citric acid solution adjusted to a pH of 2.9 by the addition of sodium hydroxide.

An aqueous waste stream was withdrawn from the bottom of the "A" column at the rate of 4.35 liters per minute. The organic, strontium-containing stream was withdrawn from the top of the "A" column and fed to the bottom of the "B" column.

To the top of the "B" column was fed a stripping solvent, a 1 M aqueous solution of citric acid, at the rate of 0.25 liter per minute.

The stripped organic solvent (hydrocarbon, HDEHP and TBP) was withdrawn from the top of the column and recycled to the "A" column.

From the bottom of the "B" column an aqueous intermediate product stream was removed. About one third of this intermediate product was recycled to the feed. This recycle increases the concentration of the strontium in the feed and, hence, in the product.

The intermediate product was then diluted slightly and adjusted to pH 2.7 by the addition of NaOH to form the feed to the ion exchange column. It then had the composition shown in Table 2.

*Table 2*

| | |
|---|---|
| M Sr | 0.032 |
| M Ca | 0.007 |
| M Ba | <0.0009 |
| M Mn | 0 |
| M Na | ~0.2 |
| M acetate | 0 |
| M EDTA | 0 |
| M citrate | 0.89 |
| pH | 2.7 |
| C/L Sr-90 | 227 |
| C/L Ce-144 | 9 |
| C/L ZrNb-95 | <0.009 |
| C/L Ru-106 | <0.02 |

This was fed to the ion exchange column at 1.1 liters per minute. This amounted to 3.2 milliliters per minute per square centimeter of bed cross section. The ion exchange column was serviced by a beta and gamma monitor to indicate loading and break-through cycles. The capacity of the ion exchange bed was sufficient to retain the entire run of strontium-90 (about 200 kilocuries) in one loading.

The loaded resin was scrubbed with nearly four column volumes of citric acid at a pH of 2.8 to 3.0 and about the same rate as the feed, to remove most of the remaining cerium and other rare earths, in place of the pH-4 EDTA shown in the drawing. After removal of the citric acid by flushing with water, eighty percent of the strontium was eluted with about two column volumes of 4 M NaNO$_3$, fed at 2 ml./min. per sq. cm. of bed cross section. This strontium constituted the product.

The remaining strontium was removed, and the resin cleaned up, by elution with EDTA at pH 8.6. Over three column volumes of EDTA solution were used to assure adequate cleanup of the resin for disposal. The EDTA eluate was held for rework.

A summary of the results of this run is given in Table 3.

*Table 3*

Sr-90 input: 210 kilocuries
Sr-90 product: 180 kilocuries (including 32 kc. requiring rework)

SOLVENT EXTRACTION

| | Column A | Column B | Ion Exchange | Overall |
|---|---|---|---|---|
| Sr Loss, Percent | 6 | 1 | 0.5 | [1] 14 |
| Sr Product DF's:[2] | | | | |
| Ce | ~4.5 | 55 | 80 | $\geq 2 \times 10^4$ |
| ZrNb | $\geq 1,400$ | $\geq 45$ | | $\geq 1.2 \times 10^5$ |
| Ru | $\geq 150$ | $\geq 10$ | | $\geq 2.4 \times 10^8$ |
| Ca | | 9 | 1.9 | 17 |
| Ba | $\geq 6$ | | $\leq 5$ | > 28 |
| Fe | | | | >2,000 |

[1] Includes 6% unaccounted for.
[2] Decontamination factors.

A comparison of the quality of the strontium-90 recovered with the requirements of the specifications for its intended use is contained in Table 4.

*Table 4*

| Element | Curies/Curie Sr-90 | | Grams/Grams Sr Total | |
|---|---|---|---|---|
| | Actual | Spec. | Actual | Spec. |
| Sr-90 | 1 | 1 | 0.568 | |
| Ce-144 | $\leq 5 \times 10^{-4}$ | $\leq 1 \times 10^{-3}$ | | |
| ZrNb-95 | $\leq 2 \times 10^{-5}$ | $\leq 8 \times 10^{-4}$ | | |
| Ru-106 | $\leq 5 \times 10^{-5}$ | $\leq 6 \times 10^{-4}$ | | |
| Ca | | | 0.05 | |
| Ba | | | $\leq 0.01$ | <0.33 |
| Fe | | | $\leq 0.003$ | |

It will be noted that the purity considerably exceeds the requirements.

EXAMPLE 2

In a subsequent run, DTPA was substituted for EDTA in the extraction step. In this run, the product from the "B" column was sufficiently pure to meet the specifications and the ion exchange step was not employed. Otherwise the process was the same as for Example 1. The results are summarized in Table 5.

*Table 5*

Sr-90 input: 363 kilocuries
Sr-90 product: 305 kilocuries

| | Column | | Overall |
|---|---|---|---|
| | A | B | |
| Sr Loss, Percent | 13 | 3 | 16 |
| Sr Product df's: | | | |
| Ce | ~24 | ~100 | 2,400 |
| ZrNb | >510 | | >1,800 |
| Ru | >30 | | >90 |
| Ca | | 40 | 40 |
| Ba | 9.6 | | 9.4 |

PRODUCT PURITY

| Element | Curies/Curie Sr-90 | | Grams/Gram Sr Total | |
|---|---|---|---|---|
| | Actual | Spec. | Actual | Spec. |
| Ce-144 | $1.1 + 10^{-3}$ | $\leq 10^{-3}$ | | |
| ZrNb-95 | $>3.5 + 10^{-5}$ | $\leq 8 + 10^{-4}$ | | |
| Ru-106 | $>7 + 10^{-5}$ | $\leq 6 + 10^{-4}$ | | |
| Ca | | | 0.020 | $>0.33$ |
| Ba | | | 0.020 | |

It will be noted that the purity considerably exceeds the requirements, except as to cerium, the content of which is substantially at the acceptable limit.

While we have described one example in detail, it will be understood that our invention is to be considered limited only by the scope of the appended claims.

What is claimed is:

1. A process of recovering strontium values from an aqueous waste solution containing said strontium values in a relatively small concentration and other alkali metal, alkaline earth metal, lanthanide, zirconium, niobium, lead, iron and ruthenium values in a predominant concentration, comprising adjusting the pH value of the aqueous waste solution to between 4 and 5;
   adding ethylenediaminetetraacetic acid to the solution, whereby a feed solution is obtained in which all multivalent cations are complexed, while cesium values and alkaline earth metal values remain uncomplexed;
   contacting the feed solution with di-2-ethylhexylphosphoric acid whereby the calcium, strontium, part of the sodium and a small fraction of the lanthanide rare earths are extracted into an organic extract phase, while the remaining sodium, most of the lanthanide rare earths, iron, lead, zirconium, niobium, cesium and ruthenium are retained in the aqueous waste solution;
   separating the organic extract from the aqueous waste;
   adding an aqueous citric acid stripping solution to the organic extract, whereby an aqueous extract is obtained containing part of the calcium, some rare earth values, sodium and practically all of the strontium values, whereas the stripped organic extract contains calcium values, the lanthanide rare earth values and traces of iron, lead, zirconium and niobium values, said citric acid solution being added in a quantity and concentration to yield a pH value of between 2 and 2.4 in the ensuing aqueous extract;
   separating the aqueous extract from the stripped organic extract;
   adjusting the pH value of the aqueous extract to between 2.5 and 3.5;
   contacting a cation exchange resin with the adjusted aqueous extract, whereby the strontium and calcium are adsorbed on the resin, while the citric-acid-complexed rare earth values remain in the aqueous extract;
   separating the resin from the aqueous extract;
   contacting the cation exchange resin with an aqueous wash solution of a complexing agent selected from the group consisting of ethylenediaminetetraacetic acid, N-hydroxyethylethylenediaminetriacetic acid, diethylenetriaminepentaacetic acid, their sodium salts and citric acid, whereby adsorbed traces of rare earths, zirconium, niobium, iron, lead and ruthenium are removed from the resin;
   separating the wash solution from the resin;
   contacting the resin with an aqueous solution of sodium nitrate, whereby all strontium is eluted from the resin and dissolved in said sodium nitrate solution;
   and separating said strontium-containing sodium nitrate solution from the resin.

2. The process of claim 1 wherein the volume used of di-2-ethylhexylphosphoric acid is less than that of the feed, the volume of the citric acid stripping solution is less than the volume of the di-2-ethylhexylphosphoric acid and the volume of the sodium nitrate eluant solution is less than that of the citric acid stripping solution.

3. The process of claim 2 wherein the volume ratio of feed solution:solvent extractant:back extractant:sodium nitrate solution is about 100:25:6:2.5.

4. The process of claim 2 wherein the pH value of the aqueous waste solution is adjusted to about 4.7.

5. The process of claim 2 wherein the feed solution is contacted with di-2-ethylhexylphosphoric acid in the form of a mixture with tributyl phosphate and a hydrocarbon diluent.

6. The process of claim 5 wherein the di-2-ethylhexylphosphoric acid solution is a kerosene solution 0.4 M in di-2-ethylhexylphosphoric acid and 0.2 M in tributyl phosphate.

7. The process of claim 2 wherein the citric acid solution used for stripping the organic extract contains citric acid in a concentration of about 1 M and has a pH value of about 1.4.

8. The process of claim 2 wherein the pH of the aqueous extract is adjusted to about 3.

9. The process of claim 2 wherein the cation exchange resin is used in the sodium form.

10. The process of claim 2 wherein the aqueous complexing wash solution for the resin is about 0.02 M in sodium salt of ethylenediaminetetraacetic acid, 0.2 M in acetic acid and has a pH value of between 3.5 and 4.

11. The process of claim 2 wherein the sodium nitrate solution for elution of the strontium values from the resin has a concentration of about 3 M.

12. The process of claim 2 wherein the organic extract is contacted with an aqueous scrubbing solution of citric acid about ⅕ the volume of the organic extract, prior to back-extraction, said citric acid having a pH value of between 2.6 and 3.

13. A process of recovering strontium values from an aqueous waste solution containing said strontium values in a relatively small concentration and other alkali metal, alkaline earth metal, lanthanide, zirconium, niobium, lead, iron and ruthenium values in a predominant concentration, comprising adjusting the pH value of the aqueous waste solution to about 4.7;
   adding ethylenediaminetetraacetic acid to the solution, whereby a feed solution is obtained in which all multivalent cations are complexed while cesium values and alkaline earth metal values remain uncomplexed;
   contacting the feed solution with a kerosene solution 0.4 M in di-2-ethylhexyphosphoric acid and 0.2 M in tributyl phosphate, whereby the calcium, strontium, part of the sodium and a small fraction of the lanthanide rare earths are extracted into an organic extract phase, while the remaining sodium, most of the lanthanide rare earths, iron, lead, zirconium, niobium, cesium and ruthenium are retained in the aqueous waste solution;
   separating the organic extract from the aqueous waste;
   scrubbing the organic extract with about ⅕ of its volume of an aqueous citric acid solution of a pH value of 2.6, whereby part of the sodium present in the organic extract is back-extracted and entrained aqueous droplets are disengaged;
   adding a 1 M aqueous citric acid stripping solution of a pH value of about 1.4 to the organic extract, whereby an aqueous extract is obtained containing part of the calcium, some rare earth values, sodium and practically all of the strontium values, whereas the stripped organic extract contains citric-acid-complexed calcium values, the lanthanide rare earth values and traces of iron, lead, ziroconium and niobium values, said citric acid solution being added in a quantity and concentration to yield a pH value of between 2 and 2.4 in the ensuing aqueous extract;

separating the aqueous extract from the stripped organic extract;
adjusting the pH value of the aqueous extract to about 3;
contacting a cation exchange resin in its sodium form with the adjusted aqueous extract, whereby the strontium and calcium are absorbed on the resin while the critric-acid-complexed rare earth values remain in the aqueous extract;
separating the resin from the aqueous extract;
containing the cation exchange resin with an aqueous wash solution 0.02 M in the sodium salt of ethylenediaminetetraacetic acid, 0.2 M in acetic acid and having a pH value of between 3.5 and 4, whereby adsorbed traces of rare earths, zirconium, niobium, iron, lead and ruthenium are removed from the resin;
separating the wash solution from the resin;
contacting the resin with an aqueous 3 M sodium nitrate solution, whereby all strontium is eluted from the resin and dissolved in said sodium nitrate solution;
and separating said strontium-containing sodium nitrate solution from the resin, the volume ration of feed:scrub:solvent extractant:back - extractant:sodium nitrate solution being approximately 100: 5:25:6:2.5.

14. A process of recovering stronium values from an aqueous waste solution containing said strontium values in a relatively small concentration and other alkali metal, alkaline earth metal, lanthanide, zirconium, niobium, lead, iron and ruthenium values in a predominant concentration, comprising adjusting the pH value of the aqueous waste solution to between 4 and 6;
adding a compound selected from the class consisting of diethylenetriaminepenetaacetic acid and ethylenediaminetetraacetic acid to the solution, whereby a feed solution is obtained in which all multivalent cations are complexed, while cesium values and alkaline earth metal values remain uncomplexed;
contacting the feed solution with di-2-ethylhexylphosphoric acid whereby the calcium, strontium, part of the sodium and a small fraction of the lanthanide rare earths are extracated into an organic extract phase, while the remaining sodium, most of the lanthanide rare earths, iron, lead, zirconium, niobium, cesium and ruthenium are retained in the aqueous waste solution;
separating the organic extract from the aqueous waste;
adding an aqueous citric acid stripping solution to the organic extract, whereby an aqueous extract is obtained containing part of the calcium, are rare earth values, sodium and practically all of the strontium values, whereas the stripped organic extract contains calcium values, the lanthanide rare earth values and traces of iron, lead, zironium and niobium values, said citric acid solution being added in a quantity and concentration to yield a pH value of between 2 and 2.4 in the ensuing aqueous extract; and separating the aqueous extract from the stripped organic extract.

References Cited in the file of this patent

"Reactors Fuel Processing," II, October 1960, vol. 3, No. 4, pp. 20–21.

"Reactor Fuel Processing," I, April 1962, vol. 5, No. 2, p. 56.

UNITED STATES PATENT OFFICE
CERTIFICATE OF CORRECTION

Patent No. 3,154,500            October 27, 1964

George Jansen, Jr., et al.

It is hereby certified that error appears in the above numbered patent requiring correction and that the said Letters Patent should read as corrected below.

Column 3, line 17, for "0.0005" read -- 0.005 --; column 8, Table 3, under the heading "Overall", line 4 thereof, for ">2.4x10$_c$" read -- >2.4x10$^3$ --; same column 8, Table 5, "Column A", line 6 thereof, for "9.6" read -- 9.4 --; column 11, line 7, for "absorbed" read -- adsorbed --; line 11, for "ration" read -- ratio --; line 34, for "6" read -- 5 --; column 12, line 18, for "are" read -- some --.

Signed and sealed this 15th day of June 1965.

(SEAL)
Attest:

ERNEST W. SWIDER
Attesting Officer

EDWARD J. BRENNER
Commissioner of Patents